Figure 5:
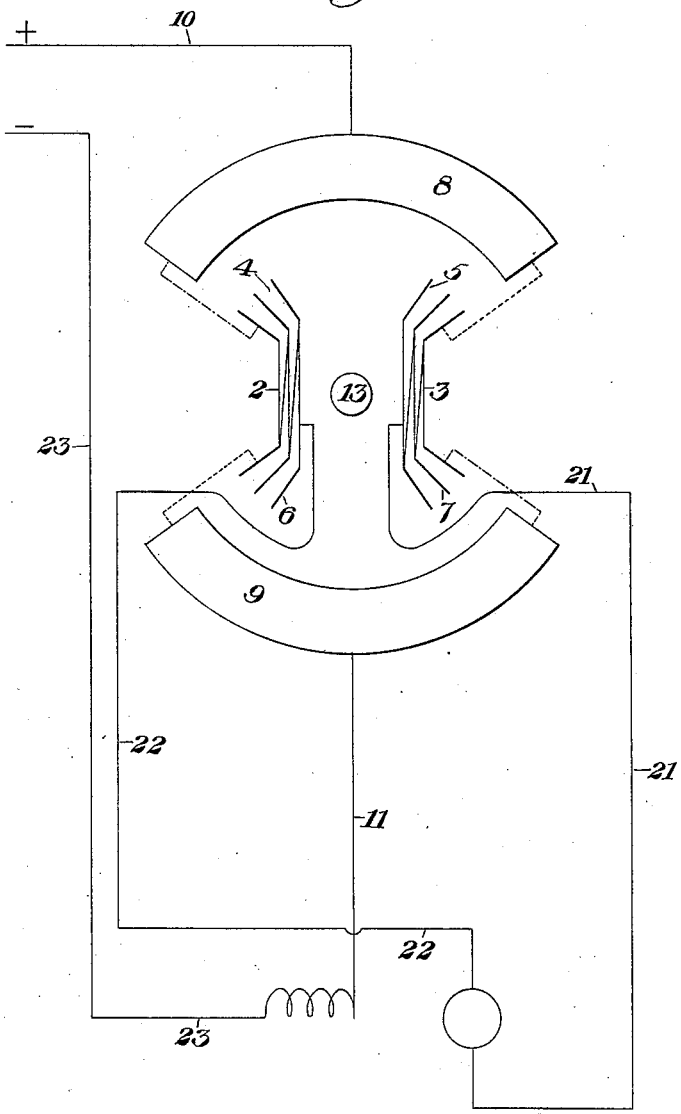

(No Model.) 3 Sheets—Sheet 1.
A. C. DINKEY.
REVERSING CONTROLLER FOR ELECTRIC MOTORS.
No. 563,575. Patented July 7, 1896.
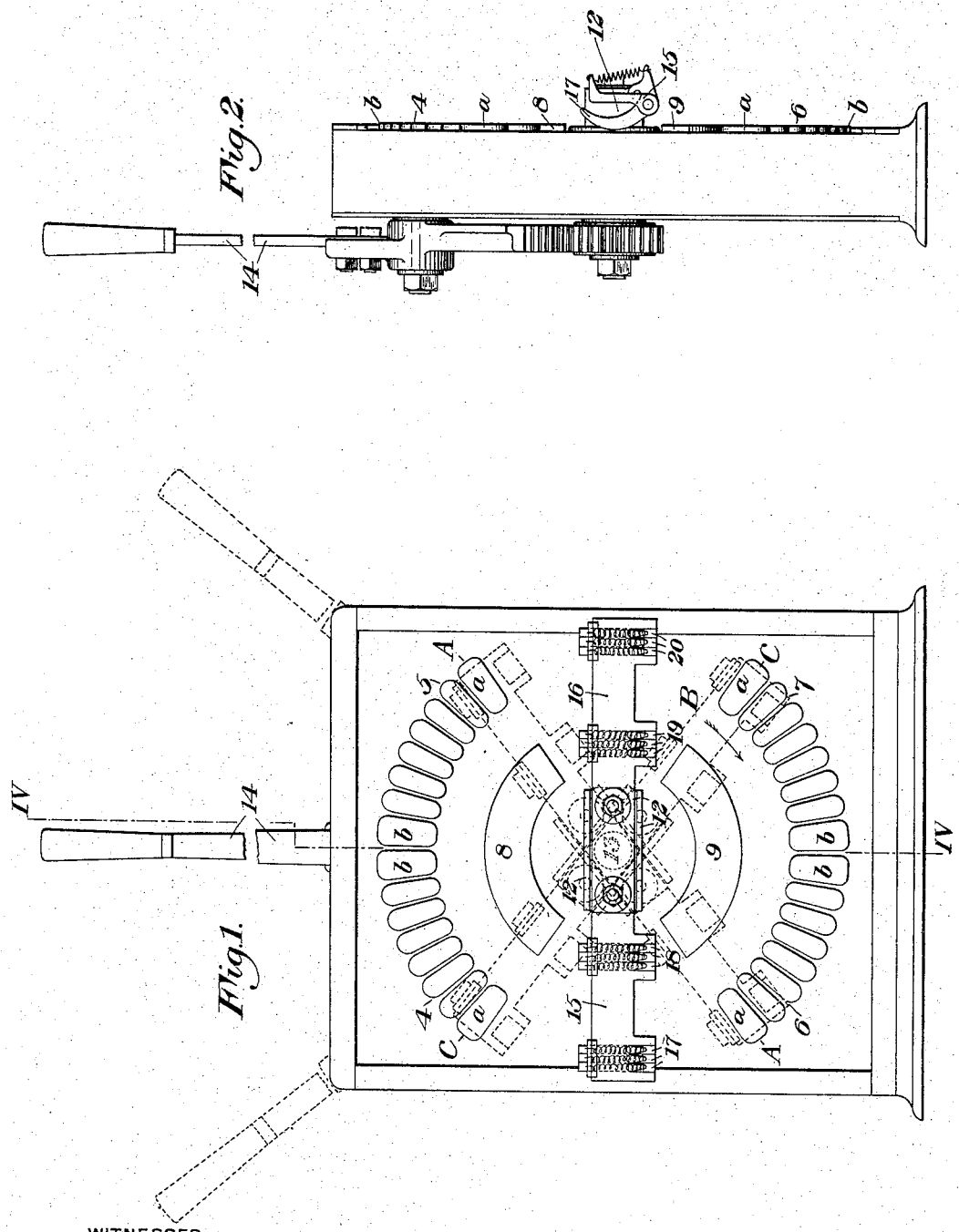
WITNESSES
INVENTOR
Alva C. Dinkey
by Bakewell & Bakewell
his Attorneys.

(No Model.) 3 Sheets—Sheet 2.
A. C. DINKEY.
REVERSING CONTROLLER FOR ELECTRIC MOTORS.
No. 563,575. Patented July 7, 1896.
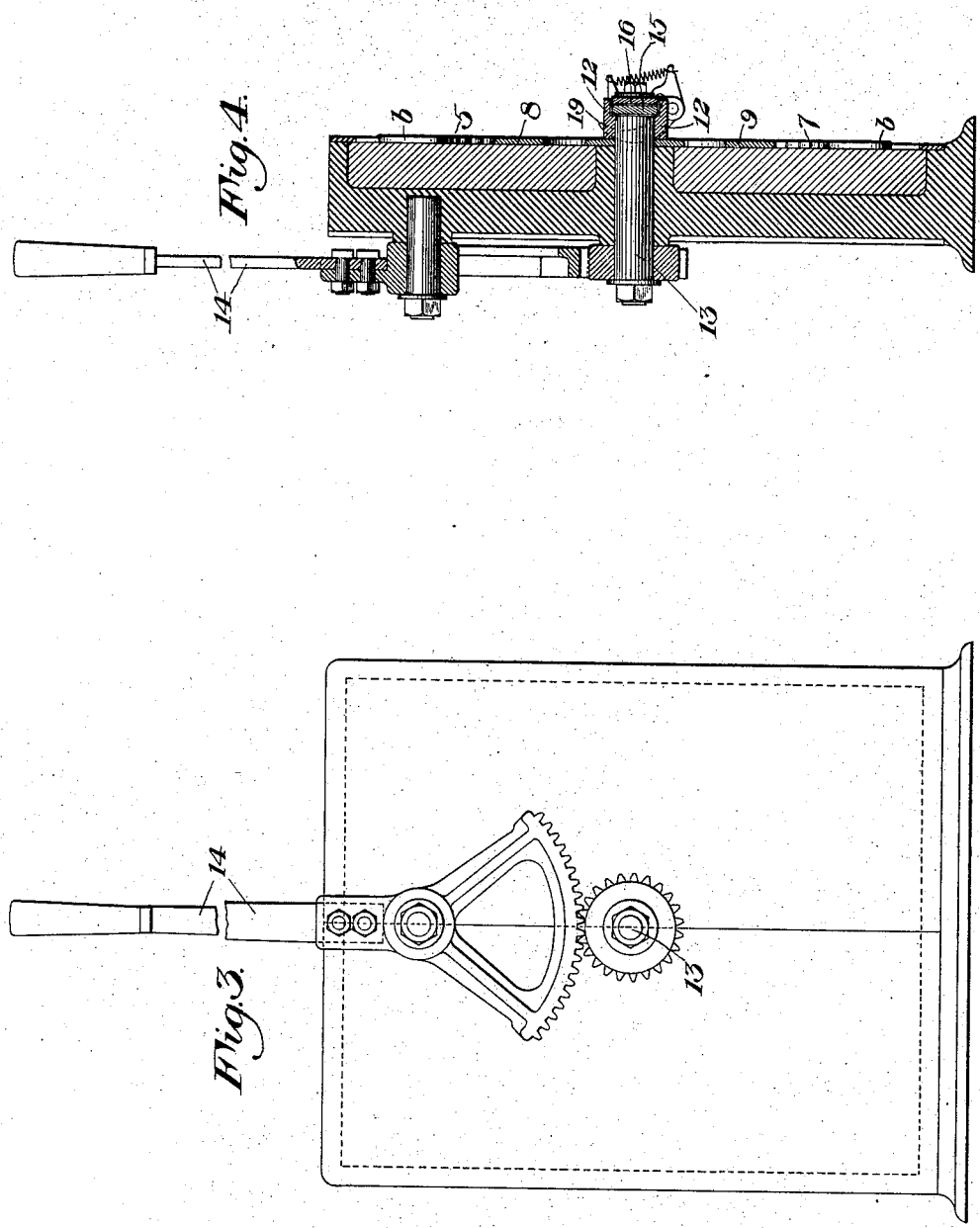

(No Model.) 3 Sheets—Sheet 3.

A. C. DINKEY.
REVERSING CONTROLLER FOR ELECTRIC MOTORS.

No. 563,575. Patented July 7, 1896.

WITNESSES

INVENTOR
Alva C. Dinkey
by Bakewell & Bakewell
his Attorneys.

UNITED STATES PATENT OFFICE.

ALVA C. DINKEY, OF MUNHALL, PENNSYLVANIA.

REVERSING-CONTROLLER FOR ELECTRIC MOTORS.

SPECIFICATION forming part of Letters Patent No. 563,575, dated July 7, 1896.

Application filed September 3, 1895. Serial No. 561,212. (No model.)

*To all whom it may concern:*

Be it known that I, ALVA C. DINKEY, of Munhall, in the county of Allegheny and State of Pennsylvania, have invented a new and useful Improvement in Reversing-Controllers for Electric Motors, of which the following is a full, clear, and exact description, reference being had to the accompanying drawings, forming part of this specification, in which—

Figure 1 is an elevation of the frame of my improved rheostat, showing the electrical contacts and the movable switch-arm. Fig. 2 is a side elevation of the same. Fig. 3 is a rear elevation. Fig. 4 is a vertical cross-section on the line IV IV of Fig. 1, and Fig. 5 is a diagrammatic view showing the manner in which the rheostat may be connected electrically with the motor and generator.

The rheostat comprises two sets of resistance coils or plates 2 3 and four series of contact-blocks 4, 5, 6, and 7, preferably arranged in circular arcs concentric with each other, the arcs 4 and 5 being disconnected electrically from each other, and the arcs 6 and 7 being also disconnected from each other. The blocks of the arcs 4 and 6 are connected with the corresponding parts of one of the two sets of resistance coils or plates, and in like manner the blocks of the arcs 5 and 7 are connected to the resistance coils or plates of the second set. The contact-blocks $a\ a$ are connected with the resistance-coils so as to give the greatest resistance to the passage of the current through them, and the blocks $b\ b$ are so connected as to afford the least resistance.

8 and 9 are contact-plates concentric with the arcs of the contact-blocks. The plate 8 is connected by a conductor 10 to one of the poles of the generator, and the plate 9 is connected to the field of the motor by a conductor 11. The contact-arm 12 is centrally pivoted at 13 and is provided with an operating-lever 14, by which it may be turned in either direction. The opposite ends 15 and 16 of the arm 12 are insulated from each other, and they are provided, respectively, with contact-fingers 17 18 19 20, the fingers 17 and 20 being adapted, respectively, to make contact with the contact-blocks of the resistance, and the fingers 18 and 19 being adapted to make contact with the arc-shaped plates 8 and 9. If the arm 12 be in the position shown by full lines in Fig. 1, the circuit through the rheostat is entirely broken. If it be moved into the position shown by the dotted lines A A in Fig. 1, it will make contact with the blocks $a$ of the arcs 5 and 6, and also with the plates 8 and 9, as shown. The current will then pass from the generator through the whole of the resistance controlled by the blocks 5 and 7, and thence, by way of a conductor 21, leading from the end of that resistance to the armature of the motor, and thence, by way of a conductor 22, to the end of the other resistance controlled by the blocks 4 and 6, and through the arm 15 and contact-plate 9 through the conductor 11 to the field of the motor, and thence by the return main conductor to the generator.

If the lever 14 be moved so as to turn the arm 12 toward the contact-blocks $b$ of the series 5 and 6, a corresponding proportion of resistance will be cut out from the circuit, and when it reaches the blocks $b\ b$ the resistance will be entirely cut out.

To cut off the current, the lever 14 is moved in the opposite direction, and when the contact-fingers reach the ends of the series of contact-blocks they simultaneously leave these blocks and the contact-plates 8 and 9, thus breaking contact simultaneously at four different points, and, by reason of the division of the arc among these four contacts, reducing the liability of the apparatus to spark.

To reverse the motor, the contact-arm 12 is turned in the direction of the arrow B until it is brought into the position shown by dotted lines C C in Fig. 1, so that the contact-fingers shall simultaneously engage the contact-blocks $a\ a$ of the arcs 4 7 and the end portions of the arc-plates 8 and 9. The effect of this is to reverse the direction of the current through the armature without reversing the current through the field, and the direction of motion of the motor will therefore be reversed. This will be apparent by reference to the diagram Fig. 4. In like manner the resistance may be cut out by moving the arm 12 on the arcs 4 and 7, and when the arm is moved in the opposite direction to break the circuit the break occurs simultaneously at four points, as above explained.

The dotted lines in Fig. 5, connecting the plate 8 with contacts 4 and 5, and plate 9 with contacts 6 and 7, taken in pairs diagonally, illustrate the connections made by the opposite ends of the arm carrying the contact-fingers as it is moved in either direction by the operator from inoperative position.

It will be apparent that the current may be reversed through the field instead of through the armature with the same effect as before, the wires 21 and 22 then being connected to the field. In either case, also, I may change the wiring by connecting the wire 10 to the resistance 2 and the wire 11 to the resistance 3, the wire 22 then being connected to the plate 8 and the wire 21 to the contact-plate 9.

It will be understood by the skilled electrician that the electrical connection may be modified in other ways without changing the principle of operation of the rheostat.

The advantages of my improvement will be appreciated by those skilled in the art. The rheostat combines the advantages of securing simultaneously multiple breaks of the circuit, and also of providing means for reversal of the motor without the necessity for employing a separate switch.

I claim—

1. A rheostat having arc-shaped main contact-plates through which the current always passes in the same direction, separated series of resistances, each series having two sets of contact-blocks, and an arm arranged to move over said arc-shaped plates and said contact-blocks in opposite directions and thereby reverse the current; substantially as described.

2. A rheostat having arc-shaped main contact-plates through which the current always passes in the same direction, separated series of resistances, each series having two sets of contact-blocks, an arm arranged to move over said arc-shaped plates and said contact-blocks in opposite directions, and connections arranged to place a motor in series between the sets of resistances; substantially as described.

3. A rheostat having four sets of contact-blocks connected in pairs to two sets of resistances, two oppositely-located arc-shaped contact-plates, and a contact-arm having fingers adapted simultaneously to make contact with or to break contact from two disconnected series of contact-blocks and the two contact-plates; substantially as described.

In testimony whereof I have hereunto set my hand.

ALVA C. DINKEY.

Witnesses:
 THOMAS W. BAKEWELL,
 H. M. CORWIN.